United States Patent
Ishikawa et al.

(10) Patent No.: US 9,202,636 B2
(45) Date of Patent: Dec. 1, 2015

(54) PHOTOELECTRIC CONVERSION ELEMENT AND DYE-SENSITIZED SOLAR CELL

(75) Inventors: Takayuki Ishikawa, Tokyo (JP); Kazuya Isobe, Tokyo (JP); Hidekazu Kawasaki, Tokyo (JP)

(73) Assignee: KONICA MINOLTA BUSINESS TECHNOLOGIES, INC., Tokyo (JP)

( * ) Notice: Subject to any disclaimer, the term of this patent is extended or adjusted under 35 U.S.C. 154(b) by 568 days.

(21) Appl. No.: 13/315,505

(22) Filed: Dec. 9, 2011

(65) Prior Publication Data

US 2012/0152356 A1    Jun. 21, 2012

(30) Foreign Application Priority Data

Dec. 21, 2010  (JP) ................................. 2010-284220

(51) Int. Cl.
*H01L 31/0256* (2006.01)
*H01L 31/0216* (2014.01)
*H01G 9/20* (2006.01)

(52) U.S. Cl.
CPC ........... *H01G 9/2059* (2013.01); *H01G 9/2031* (2013.01); *Y02E 10/542* (2013.01)

(58) Field of Classification Search
CPC ... Y02E 10/542; H01G 9/2059; H01G 9/2031
See application file for complete search history.

(56) References Cited

U.S. PATENT DOCUMENTS

2006/0234505 A1* 10/2006 Asano et al. ................... 438/688
2010/0275988 A1* 11/2010 Kawasaki et al. ............. 136/256

FOREIGN PATENT DOCUMENTS

| JP | 2000-090991 | 3/2000 |
|---|---|---|
| JP | 2004-047229 | 2/2004 |
| JP | 2009-081141 | 4/2009 |
| JP | 2010-267612 | 11/2010 |

OTHER PUBLICATIONS

Shi et al., "An inexpensive and efficient pyridine-based additive for the electrolyte of dye-sensitized solar cells," J. Power Sources, 193 (2009), 878-884.*
B. O'Regan and M. Gratzel: Nature, 353, 737 (1991).
Japanese Office Action, Patent Application No. 2010-284220, dated May 20, 2014 (3 pages).
English translation of apanese Office Action, Patent Application No. 2010-284220, dated May 20, 2014 (3 pages).

* cited by examiner

*Primary Examiner* — Ling Choi
*Assistant Examiner* — Catherine S Branch
(74) *Attorney, Agent, or Firm* — Lucas & Mercanti, LLP

(57) ABSTRACT

A photoelectric conversion element comprising: a substrate; a first electrode; a photoelectric conversion layer comprising a semiconductor layer containing a dye and a semiconductor and a charge transport layer; and a second electrode, in this order, wherein the photoelectric conversion layer comprises a compound represented by Formula (1), wherein $R_1$ and $R_2$ each represent a hydrogen atom or an alkyl group which may have a substituent, X, Y and Z each represent a hydrogen atom or a substituent, wherein at least one of X, Y and Z is an electron withdrawing group.

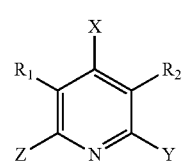

Formula (1)

10 Claims, 1 Drawing Sheet

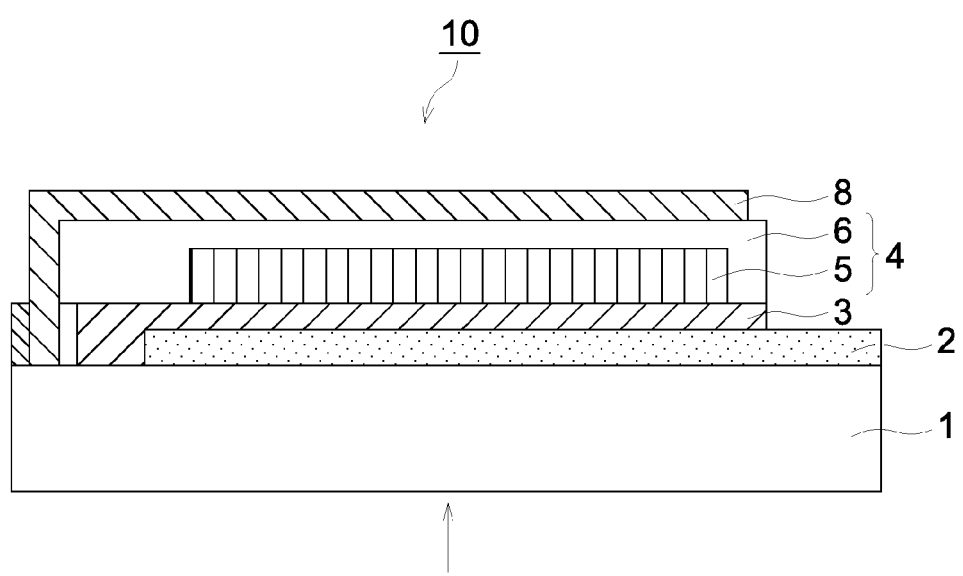

PHOTOELECTRIC CONVERSION ELEMENT AND DYE-SENSITIZED SOLAR CELL

This application claims priority from Japanese Patent Application No. 2010-284220 filed on Dec. 21, 2010, which is incorporated hereinto by reference.

TECHNICAL FIELD

The present invention relates to a photoelectric conversion element and a solar cell employing the photoelectric conversion element, and, in more detail, relates to a dye-sensitized photoelectric conversion element and a dye-sensitized solar cell employing the same.

BACKGROUND OF THE INVENTION

In recent years, attention has been focused on solar energy as an energy source because of environmental problems and so forth.

Methods of converting light or heat of solar energy into electrical energy as usable energy have become practically available.

Among these methods, a method of converting sunlight into electrical energy, for example, is a typical example, and a photoelectric conversion element is utilized in this method.

The photoelectric conversion element in which an inorganic material such as single crystalline silicon, polycrystalline silicon, amorphous silicon, and cadmium telluride, indium copper selenide or the like is employed is widely used as a photoelectric conversion element, and has been utilized for a so-called solar cell.

A solar cell employing a photoelectric conversion element in which an inorganic material is used has had problems, for example, a high purity product obtained via a high purification process is needed for silicon used as a material, and the manufacturing processes is complicated and contains a lot of processes since a multilayered pn junction structure is employed, whereby the manufacturing cost is high.

On the other hand, studies of a photoelectric conversion element in which an organic material is used as a simple element have been also in progress.

As described in C. W. Jang: Applied Physics Letters, 48, 183 (1986), for example, reported is a p-n junction type organic photoelectric conversion element in which a perylenetetracarboxylic acid derivative as an n-type organic dye and a copper phthalocyanine as a p-type organic dye are joined.

In order to improve a short exciton diffusion length and thin thickness of a space-charge layer taken into account as a drawback, results thereof are being made by largely increasing the area of a p-n junction region where organic thin films are simply layered to sufficiently secure the number of organic dyes which contribute the charge separation.

Further, as described in G. Yu, J. Gao, J. C. Humelen, F. Wudl and A. J. Heeger: Science, 270, 1789 (1996), disclosed is a technique by which the p-n junction region is largely increased by mixing a n-type electron-conductive organic material and a p-type hole-conductive polymer in the film to conduct charge separation in the entire film. Proposed was a photoelectric conversion element in which Heeger et al. made a conjugated polymer to be a p-type conductive polymer in 1995 to mix fullerene as an electron-conductive material.

Such a photoelectric conversion element gradually exhibits an improved property thereof, but stable behavior with high conversion efficiency has not been obtained yet.

However, in 1991, Gratzel succeeded in preparation of a photoelectric conversion element having a high conversion efficiency in stable operation by preparing porous titanium oxide, and sufficiently securing the charge separation area (the number of molecules contributed for charge separation) in detailed experiments having been enormously compiled (for example, refer to Non-Patent Document 1).

In the case of this photoelectric conversion element, repeated are cycles in which a dye adsorbed onto the surface of porous titanium oxide is optically excited to form a dye cation via electron-injection from the dye to the titanium oxide, and the dye receives electrons from the counter electrode via a charge transport layer. An electrolytic solution in which an electrolyte containing iodine is dissolved in an organic solvent is used as a charge transport layer.

In combination with the stability of the titanium oxide, this photoelectrical conversion element exhibits excellent reproducibility, the R&D base thereof has largely expanded, and this photoelectric conversion element receives notable expectation and attention while it is also called a dye-sensitized solar cell. This technique has an advantage to effectively convert sunlight having a large amount of visible light components into electricity since it is not necessary to purify an inexpensive semiconductor material such as titanium oxide into a high purity grade and thus an inexpensive semiconductor material can be used, and the usable light expands to a broad range of visible light.

However, these conventional dye-sensitized solar cells have had problems that the obtained voltage is not fully sufficient as the result of an inverse current which occurs independently of the light irradiation.

As a technique to overcome the problem of such a lower obtained voltage, proposed has been a technique to incorporate an amino-pyridine compound in the electrolyte solution of a photoelectric conversion element having a semiconductor electrode, a counter electrode and an electrolyte solution to obtain a high open circuit voltage (refer to Patent Document 1).

Further, in a dye-sensitized photoelectric conversion device, techniques to remove a dye excessively adsorbed on a semiconductor electrode have been known, for example, a technique to conduct a treatment on the surface of a conductor layer with an amine compound such as pyridine, 4-t-butylpyridine and polyvinylpyridine after a dye has been adsorbed (refer to Patent Document 2), and a photoelectric conversion element having a charge transport layer containing 4-t-butylpyridine (refer to Patent Document 3).

However, the problem has been that the photoelectric conversion efficiency has not been fully enough even in such photoelectric conversion elements.

Patent Document 1 Japanese Patent Application Publication Open to Public Inspection (hereafter referred to as JP-A) No. 2004-47229
Patent Document 2 JP-A No. 2009-81141
Patent Document 3 JP-A No. 2010-267612
Non-Patent Document 1 B. O'Regan and M. Grätzel: Nature, 353, 737 (1991)

SUMMARY OF THE INVENTION

In view of the foregoing problems, the present invention was achieved. An object of the present invention is to provide a photoelectric conversion element and a solar cell each exhibiting an excellent photoelectric conversion efficiency.

One of the aspects to achieve the above object of the present invention is a photoelectric conversion element comprising: a substrate; a first electrode; a photoelectric conversion layer comprising a semiconductor layer containing a dye and a semiconductor and a charge transport layer, and a second electrode, in this order, wherein the photoelectric conversion layer comprises a compound represented by Formula (1):

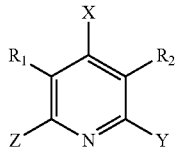

Formula (1)

wherein $R_1$ and $R_2$ each represent a hydrogen atom or an alkyl group which may have a substituent, X, Y and Z each represent a hydrogen atom or a substituent, wherein at least one of X, Y and Z is an electron withdrawing group.

BRIEF DESCRIPTION OF THE DRAWING

FIG. 1 is a schematic cross-sectional view illustrating an example of the photoelectric conversion element of the present invention.

DESCRIPTION OF THE PREFERRED EMBODIMENTS

The above object of the present invention is achieved by the following structures.
(1) A photoelectric conversion element comprising:
a substrate;
a first electrode;
a photoelectric conversion layer comprising
a semiconductor layer containing a dye and a semiconductor and
a charge transport layer, and
a second electrode,
in this order, wherein
the photoelectric conversion layer comprises a compound represented by Formula (1):

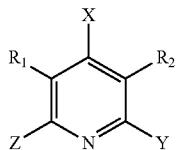

Formula (1)

wherein $R_1$ and $R_2$ each represent a hydrogen atom or an alkyl group which may have a substituent, X, Y and Z each represent a hydrogen atom or a substituent, wherein at least one of X, Y and Z is an electron withdrawing group.
(2) The photoelectric conversion element of Item (1),
wherein the electron withdrawing group is an iodo group, a cyano group, —$COR_3$, —$COOR_4$, or —$CONR_5R_6$, wherein $R_3$, $R_4$, $R_5$ and $R_6$, each represent an alkyl group which may have a substituent.
(3) The photoelectric conversion element of Item (2),
wherein the electron withdrawing group is —$COOR_4$.
(4) The photoelectric conversion element of any one of Items 1 to 3,
wherein X is the electron withdrawing group.
(5) The photoelectric conversion element of any one of Items 1 to 4,
wherein the dye has an imidazolone moiety.
(6) The photoelectric conversion element of any one of Items 1 to 4,
wherein the dye comprises ruthenium.
(7) The photoelectric conversion element of any one of Items 1 to 6,
wherein the semiconductor is subjected to a surface treatment using an organic base.
(8) The photoelectric conversion element of any one of Items 1 to 7,
wherein the semiconductor comprises a titanium oxide.
(9) The photoelectric conversion element of any one of Items 1 to 8,
wherein the charge transport layer is formed via polymerization.
(10) The photoelectric conversion element of any one of Items 1 to 9,
wherein the charge transport layer comprises a thiophene derivative.
(11) A solar cell comprising the photoelectric conversion element of any one of Items 1 to 10.

According to the present invention, a photoelectric conversion element and a dye sensitized solar cell each exhibiting an excellent photoelectric conversion efficiency can be provided.

One of the features of the present invention is a photoelectric conversion element containing (i) a substrate, (ii) a first electrode, (iii) a photoelectric conversion layer containing a semiconductor layer having a dye and a semiconductor and a charge transport layer, and (iv) a second electrode, in this order, the photoelectric conversion layer containing a compound represented by above Formula (1).

In the present invention, by having a photoelectric conversion layer in which a specific compound represented by Formula (1) is carried, a photoelectric conversion element exhibiting a high photoelectric conversion efficiency can be obtained.

(Photoelectric Conversion Element)

The photoelectric conversion element of the present invention will be explained with referring to FIG. 1. FIG. 1 is a schematic cross-sectional view illustrating an example of a photoelectric conversion element of the present invention.

As shown in FIG. 1, the photoelectric conversion element 10 formed by having a substrate 1, a first electrode 2, a photoelectric conversion layer 4, and a second electrode 8 in this order. The photoelectric conversion layer 4 has the semiconductor layer 5 and the charge transport layer 6. The semiconductor layer 5 contains a semiconductor and a dye.

For the purpose of sealing and avoiding a short circuit, a barrier layer 3 is preferably provided between the first electrode 2 and the photoelectric conversion layer 4. The sun light enters into the photoelectric conversion element along the direction of the arrow shown in the lower part of the FIGURE.

An example of manufacturing the photoelectric conversion element of the present invention will be shown below.

After adhering a barrier layer 3 on a substrate 1 attached with a first electrode 2 (also referred to as a conductive substrate), a layer containing a semiconductor is formed on the barrier layer 3, and a dye is adsorbed on the semiconductor surface to form a semiconductor layer 5. Then, a charge transport layer 6 is formed on the semiconductor layer 5.

The charge transport layer 6 is formed on the semiconductor layer containing a semiconductor which carries a sensitizing dye, however, the charge transport layer 6 may have a structure in which the charge transport layer also soaks into the semiconductor layer. A second electrode 8 is adhered to the charge transport layer 6. A terminal can be attached to each of the first electrode 2 and the second electrode 8, whereby current can be taken out.

The photoelectric conversion layer of the present invention has a semiconductor layer containing a semiconductor and a dye, and a charge transport layer which will be mentioned later, and the photoelectric conversion layer also contains a compound represented by above-mentioned Formula (1).

In the present invention, the compound represented by Formula (1) is contained in a semiconductor layer or in a charge transport layer, or contained in a semiconductor layer and in a charge transport layer. It is preferable that the compound represented by Formula (1) is contained in a semiconductor layer.

(Compound Represented by Formula (1))

In Formula (1), X, Y, and Z each represent a hydrogen atom or a substituent, wherein at least one of X, Y, and Z represents an electronic withdrawing group.

An electronic withdrawing group means a substituent which has an effect of lowering the charge density of carbon at the α position when replaced with a substituent, and, for example, it is a substituent of which the substituent constant of Hammett σp is a positive value.

Specific examples of an electron withdrawing group include: halogen atoms such as a chlorine atom, a bromine atom, and a bromine atom; a cyano group; a nitro group; halogenated alkyl groups such as trihaloalkyl group; and —$COR_3$, —$COOR_4$ and —$CONR_5R_6$ ($R_3$, $R_4$, $R_5$, and $R_6$ each representing an alkyl group which may have a substituent).

Of these, specifically, an iodo group, a cyano group, —$COR_3$, —$COOR_4$, and —$CONR_5R_6$ are preferably used.

$R_1$ and $R_2$ each represent an alkyl group which may have a substituent. As an alkyl group which may have a substituent represented by $R_1$ and $R_2$, an alkyl group having 1-20 carbon atoms may be cited, and, for example, lower alkyl groups such as a methyl group, an ethyl group, a propyl group, butyl, and a heptyl group are preferably used.

Examples of a substituent include an alkyl group such as a methyl group, an ethyl group, a propyl group, an isopropyl group, a tert-butyl group, a pentyl group, a hexyl group, an octyl group, a dodecyl group, a tridecyl group, a tetradecyl group and a pentadecyl group, a cycloalkyl group such as a cyclopentyl group and a cyclohexyl group, an alkenyl group such as a vinyl group and an allyl group, an alkynyl group such as ethynyl group and a propargyl group, an aryl group such as a phenyl group and a naphthyl group, a heteroaryl group such as a furyl group, a thienyl group, an indolyl group, a coumarinyl group, a pyridyl group, a pyridazyl group, a pyrimidyl group, a pyrazyl group, a triazyl group, an imidazolyl group, a pyrazolyl group, a thiazolyl group, a quinazolyl group, carbazolyl group, carbolinyl group, diazacarbazolyl group (a compound in which one of arbitrary carbon atoms constituting the carboline ring of the above carboline group is replaced with a nitrogen atom) and phthalazinyl group, a saturated heterocyclic group such as a pyrrolidinyl group, an imidazolidinyl group, a morpholyl group and an oxazolidinyl group, an alkoxyl group such as a methoxy group, an ethoxy group, a propyloxy group, a pentyloxy group, a hexyloxy group, an octyloxy group and a dodecyloxy group, a cycloalkoxyl group such as a cyclopentyloxy group and a cyclohexyloxy group, an aryloxyl group such as a phenoxy group and a naphthyloxy group, an alkylthio group such as a methylthio group, an ethylthio group, a propylthio group, a pentylthio group, a hexylthio group, an octylthio group and a dodecylthio group, a cycloalkylthio group such as a cyclopentylthio group and cyclohexylthio group, an arylthio group such as a phenylthio group and a naphthylthio group, an alkoxycarbonyl group such as a methyloxycarbonyl group, an ethyloxycarbonyl group, a butyloxycarbonyl group, an octyloxycarbonyl group and dodecyloxycarbonyl group, an aryloxycarbonyl group such as a phenyloxycarbonyl group and a naphthyloxycarbonyl group, a sulfamoyl group such as an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group and a 2-pyridylaminosulfonyl group, an acyl group such as an acetyl group, an ethylcarbonyl group, a propylcarbonyl group, a pentylcarbonyl group, a cyclohexylcarbonyl group, an octylcarbonyl group, a 2-ethylhexylcarbonyl group, a dodecylcarbonyl group, a phenylcarbonyl group, a naphthylcarbonyl group and a pyridylcarbonyl group, an acyloxy group such as an acetyloxy group, an ethylcarbonyloxy group, a butylcarbonyloxy group, an octylcarbonyloxy group, a dodecylcarbonyloxy group and a phenylcarbonyloxy group, an amido group such as a methylcarbonylamino group, an ethylcarbonylamino group, a dimethylcarbonylamino group, a propylcarbonylamino group, a pentylcarbonylamino group, a cyclohexylcarbonylamino group, a 2-ethylhexylcarbonylamino group, an octylcarbonylamino group, a dodecylcarbonylamino group, a phenylcarbonylamino group and a naphthylcarbonylamino group, a carbamoyl group such as an aminocarbonyl group, a methylaminocarbonyl group, a dimethylaminocarbonyl group, propylaminocarbonyl group, a pentylaminocarbonyl group, cyclohexylaminocarbonyl group, an octylaminocarbonyl group, a 2-ethylhexylaminocarbonyl group, a dodecylaminocarbonyl group, a phenylaminocarbonyl group, a naphthylaminocarbonyl group and a 2-pyridylaminocarbonyl group, a ureido group such as a methylureido group, an ethylureido group, pentylureido group, a cyclohexylureido group, an octylureido group, a dodecylureido group, a phenylureido group, a naphthylureido group and a 2-pyridylureido group, a sulfinyl group such as a methylsulfinyl group, an ethylsulfinyl group, a butylsulfinyl group, a cyclohexylsulfinyl group, a 2-ethylhexylsulfinyl group, a dodecylsulfinyl group, a phenylsulfinyl group, a naphthylsulfinyl group and a 2-pyridylsulfinyl group, an alkylsulfonyl group such as a methylsulfonyl group, an ethylsulfonyl group, a butylsulfonyl group, a cyclohexylsulfonyl group, a 2-ethylhexylsulfonyl group and a dodecylsulfonyl group, an arylsulfonyl group or a heteroarylsulfonyl group such as a phenylsulfonyl group, a naphthylsulfonyl group and a 2-pyridylsulfonyl group, an amino group such as an amino group, an ethylamino group, a dimethylamino group, a butylamino group, a cyclopentylamino group, a 2-ethylhexylamino group, a dodecylamino group, an anilino group, a naphthylamino group and a 2-pyridylamino group, a halogen atom such as a fluorine atom, a chlorine atom and a bromine atom, a fluorinated hydrocarbon group such as a fluoromethyl group, a trifluoromethyl group, a pentafluoroethyl group and a pentafluorophenyl group, a cyano group, a nitro group, a hydroxyl group, a mercapto group, and a silyl group such as trimethulsilyl group, triisopropylsilyl group, a triphelylsilyl group and phenyldiethylsilyl group.

These groups may further be substituted by an aforementioned substituent. Or, a plurality of the above substituents may be combined to form a ring.

The following compounds may be cited as specific examples of a compound represented by Formula (1). In the following compounds, the wavy line provided in a substructure means a bond by which the substructure is bonded.

| Compound | $R_1$ | $R_2$ | X | Y | Z |
|---|---|---|---|---|---|
| 1 | H | H | Cl | H | H |
| 2 | H | H | Br | H | H |
| 3 | H | H | I | H | H |
| 4 | H | H | CN | H | H |
| 5 | H | H | $NO_2$ | H | H |
| 6 | H | H | $SO_3H$ | H | H |
| 7 | H | H | 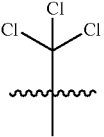 | H | H |
| 8 | H | H | $COOCH_3$ | H | H |
| 9 | H | H | $COCH_3$ | H | H |
| 10 | H | H | $CONHCH_3$ | H | H |
| 11 | H | H | 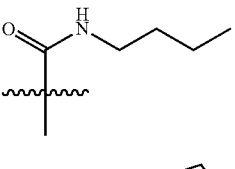 | H | H |
| 12 | H | H | 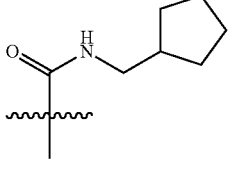 | | |
| 13 | H | H | 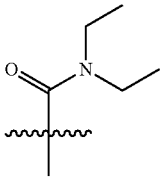 [SMILES: *C(=O)N(CC)CC] | H | H |
| 14 | H | H | 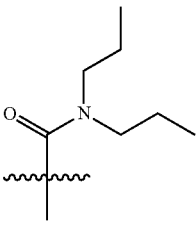 [SMILES: *C(=O)N(CCC)CCC] | H | H |
| 15 | H | H | $CO(n)C_3H_7$ | H | H |
| 16 | H | H | $CO(n)C_4H_9$ | H | H |
| 17 | H | H | $COCH_2C(CH_3)_3$ | H | H |
| 18 | H | H | $CO(n)C_8H_{17}$ | H | H |
| 19 | H | H | $CO(n)C_{12}H_{25}$ | H | H |
| 20 | H | H | $CO(n)C_{16}H_{33}$ | H | H |
| 21 | H | H | $CO(n)C_{20}H_{41}$ | H | H |
| 22 | H | H | 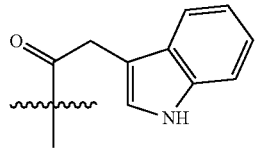 [SMILES: *C(=O)Cc1c[nH]c2ccccc12] | H | H |
| 23 | H | H | 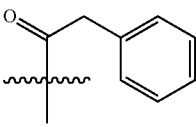 [SMILES: *C(=O)Cc1ccccc1] | H | H |

-continued

| Compound | R₁ | R₂ | X | Y | Z |
|---|---|---|---|---|---|
| 24 | H | H | (cyclopentyl-(CH₂)₇-C(=O)-) | H | H |
| 25 | H | H | (HC≡C-CH₂-C(=O)-) | H | H |
| 26 | H | H | (2-thienyl-CH₂-C(=O)-) | H | H |
| 29 | H | H | (CH₂=CH-CH₂-C(=O)-) | H | H |
| 30 | H | H | (tetrahydrofuran-2-yl-CH₂CH₂-C(=O)-) | H | H |
| 31 | H | H | (isobutyl-C(=O)-) | H | H |
| 32 | H | H | (2-ethylbutyl-C(=O)-) | H | H |
| 33 | H | H | H | Cl | H |
| 34 | H | H | H | Br | H |
| 35 | H | H | H | I | H |
| 36 | H | H | H | CN | H |
| 37 | H | H | H | NO₂ | H |
| 38 | H | H | H | SO₃H | H |

-continued
| Compound | R₁ | R₂ | X | Y | Z |
|---|---|---|---|---|---|
| 39 | H | H | H | 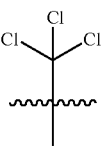 [SMILES: *C(Cl)(Cl)Cl] | H |
| 40 | H | H | H | COOCH₃ | H |
| 41 | H | H | H | COCH₃ | H |
| 42 | H | H | H | CONHCH₃ | H |
| 43 | H | H | H | 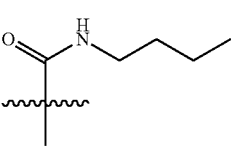 [SMILES: *C(=O)NCCCC] | H |
| 44 | H | H | H | 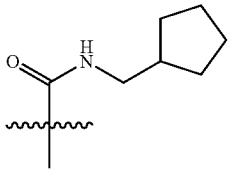 [SMILES: *C(=O)NCC1CCCC1] | H |
| 45 | H | H | H | 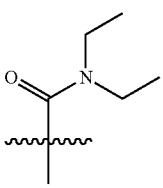 [SMILES: *C(=O)N(CC)CC] | H |
| 46 | H | H | H | 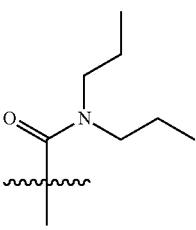 [SMILES: *C(=O)N(CCC)CCC] | H |
| 47 | H | H | H | 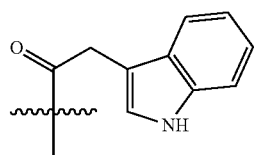 [SMILES: *C(=O)Cc1c[nH]c2ccccc12] | H |
| 48 | H | H | H | 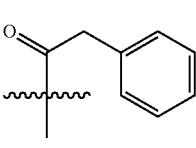 [SMILES: *C(=O)Cc1ccccc1] | H |

-continued

| Compound | R₁ | R₂ | X | Y | Z |
|---|---|---|---|---|---|
| 49 | H | H | H | -C(=O)-(CH₂)₇-cyclopentyl | H |
| 50 | H | H | H | -C(=O)-CH₂-C≡CH | H |
| 51 | H | H | H | -C(=O)-CH₂-(2-thienyl) | H |
| 52 | H | H | H | -C(=O)-CH₂-CH=CH₂ | H |
| 53 | H | H | H | -C(=O)-CH₂-CH₂-(tetrahydrofuran-2-yl) | H |
| 54 | H | H | H | -C(=O)-CH₂-CH(CH₃)₂ | H |
| 55 | H | H | H | -C(=O)-CH₂-CH(C₂H₅)₂ | H |
| 56 | H | H | H | CO(n)C₃H₇ | H |
| 57 | H | H | H | CO(n)C₄H₉ | H |
| 58 | H | H | H | COCH₂C(CH₃)₃ | H |
| 59 | H | H | H | CO(n)C₈H₁₇ | H |
| 60 | H | H | H | CO(n)C₁₂H₂₅ | H |
| 61 | H | H | H | CO(n)C₁₆H₃₃ | H |
| 62 | H | H | H | CO(n)C₂₀H₄₁ | H |
| 63 | H | H | NO₂ | Br | H |
| 64 | H | H | COOCH₃ | Br | H |
| 65 | H | H | Br | COCH₃ | H |
| 66 | H | H | H | COOCH₃ | COOCH₃ |
| 67 | H | H | COCH₃ | COCH₃ | COCH₃ |

-continued

| Compound | $R_1$ | $R_2$ | X | Y | Z |
|---|---|---|---|---|---|
| 68 | $C_2H_5$ | H | $COOCH_3$ | H | H |
| 69 | $(n)C_4H_9$ | H | $COOCH_3$ | H | H |
| 70 | $C(CH_3)_3$ | H | $COOCH_3$ | H | H |
| 71 | $(n)C_8H_{17}$ | H | $COCH_3$ | H | H |
| 72 | $(n)C_{12}H_{25}$ | H | $COOCH_3$ | H | H |
| 73 | $(n)C_{16}H_{33}$ | H | $COCH_3$ | H | H |
| 74 | $(n)CH_3$ | $CH_3$ | CN | H | H |
| 75 | $(n)CH_3$ | $CH_3$ | Cl | H | H |
| 76 | $(n)C_2H_5$ | $C_2H_5$ | $COCH_3$ | H | H |
| 77 | $(n)C_8H_{17}$ | $(n)C_8H_{17}$ | $COCH_3$ | H | H |
| 78 | $CH_3$ | $CH_3$ | $COOCH_3$ | $COOCH_3$ | $COOCH_3$ |
| 79 | H | H | $SO_3CH_3$ | H | H |
| 80 | H | H | H | $SO_3CH_3$ | H |

In the present invention, the reason why the photoelectric conversion efficiency is improved by incorporating a compound represented by Formula (1) in the photoelectric conversion element is not clear, however, the reason is deduced as follows.

As one of the factors of the lowering of photoelectric conversion efficiency of a dye-sensitized solar cell, a problem may be cited that, when there exists a semiconductor surface on which no dye is adsorbed, recombination of charges due to injection of charges from the non-adsorbed surface to the charge transfer layer or to the electrode tends to occur.

In order to avoid such a problem, it is expected that adsorption of a compound which prevents direct contact of the non-adsorbed semiconductor surface with the electrolyte or the electrode would be effective.

When a known pyridine compound is used for this purpose, it is expected that such kind of reaction occurs, however, it is hardly said that an enough improvement in the photoelectric conversion efficiency is obtained. This would be because, when a pyridine compound is tried to fully adsorbed on the semiconductor surface, the adsorption force of the compound is too strong and desorption of adsorbed dye may occur due to an interchange reaction, although the adsorption of the pyridine compound to the non-adsorbed semiconductor surface is excellent, whereby improvement of the photoelectric conversion efficiency of the solar cell cannot be fully achieved.

On the contrary, when a pyridine compound represented by Formula (1) of the present invention is used, since an electron withdrawing group has been introduced in at least one of X, Y and Z Formula (1), the electron density at the portion of unpaired pair of electrons of the N atom in the pyridine ring is lowered, whereby the adsorption force of the compound to the semiconductor is lowered. Accordingly, the exchange reaction with the dye is suppressed while maintaining the adsorption force of the compound necessary to adsorb to the semiconductor, whereby it is deduced that the photoelectric conversion efficiency has been improved.

The compound represented by Formula (1) is specifically effectively employed when a dye containing a imidazolone moiety or a dye containing ruthenium is used, and when a titanium oxide is used as a semiconductor. This reason is deduced to be because the balance between the adsorption forces of these dyes and that of the compound represented by Formula (1), specifically when titanium oxide is used, is maintained in the preferable range. As the structure of a compound represented by Formula (1), preferable is a structure in which an electron withdrawing group is introduced in the para-position. This is because the desorption of the dye due to steric hinderance is avoided by introducing an electron withdrawing group at a para-position.

The compound represented by Formula (1) is contained in the charge transport layer or in the semiconductor layer, or in the charge transport layer and the semiconductor layer of the photoelectric conversion layer. When it is contained in the charge transport layer, it is deduced that the compound represented by Formula (1) stays on the contact surface between the charge transport layer and the semiconductor surface, and carry out the aforementioned function.

In the present invention, it is preferable that the compound represented by Formula (1) is contained in the semiconductor layer while the compound is adsorbed on the surface of the semiconductor layer.

The compound represented by Formula (1) may be incorporated in the photoelectric conversion layer according to a single method or in combination of plural methods among the methods listed below.

1. After a semiconductor layer is formed, the compound represented by Formula (1) is mixed with an electrolyte liquid, and a photoelectric conversion element is fabricated using the electrolyte liquid.

2 After a semiconductor layer is formed, the semiconductor layer is dipped into a solution in which the compound represented by Formula (1) is dissolved to adsorb the compound on the semiconductor layer surface, which is carried out before adsorbing a dye onto the semiconductor layer. Then, the dye is adsorbed, followed by forming a charge transport layer.

3. After a dye is adsorbed onto the semiconductor layer, the semiconductor layer is dipped into a solution in which the compound represented by Formula (1) is dissolved to adsorb the compound on the semiconductor layer surface, followed by forming a charge transport layer.

4. After a charge transport layer is formed, the product is dipped in a solution in which the compound represented by Formula (1) is dissolved to adsorb the compound.

The content of the compound represented by Formula (1) in the above electrolyte or in the above solution in which the compound represented by Formula (1) is dissolved is preferably 0.5 mM (mmol/l)-10 M (mol/l), and more preferably 10 mM-0.5M.

The photoelectric conversion element will be explained according to the order of the layer construction below.

(Semiconductor Layer)
(Semiconductor)

Usable examples of the semiconductor employed for a semiconductor layer include an elemental substance such as silicon, germanium or the like, a compound containing an element in Groups 3-5 and Groups 13-15 of the periodic table (referred to also as the element periodic table), a metal chalcogenide such as oxide, sulfide, selenide or the like, a metal nitride, and so forth.

Preferable examples of a metal chalcogenide include an oxide of titanium, tin, zinc, iron, tungsten, zirconium, hafnium, strontium, indium, cerium, yttrium, lanthanum, vanadium, niobium or tantalum; a sulfide of cadmium, zinc, lead, silver, antimony or bismuth; a selenide of cadmium or lead; a telluride of cadmium; and so forth. Examples of other compound-semiconductors include a phosphide of zinc, gallium, indium, cadmium or the like; a selenide of gallium-arsenic or copper-indium; a sulfide of copper-indium; a nitride of titanium; and so forth.

Specific examples include $TiO_2$, $SnO_2$, $Fe_2O_3$, $WO_3$, $ZnO$, $Nb_2O_5$, $CdS$, $ZnS$, $PbS$, $Bi_2S_3$, $CdSe$, $CdTe$, $GaP$, $Inp$, $GaAs$, $CuInS_2$, $CuInSe_2$, $Ti_3N_4$ and so forth, but preferably usable are $TiO_2$, $ZnO$, $SnO_2$, $Fe_2O_3$, $WO_3$, $Nb_2O_5$, $CdS$ and $PbS$; more preferably usable are $TiO_2$ and $Nb_2O_5$; and most preferably usable is $TiO_2$ (titanium dioxide).

As a semiconductor used for a semiconductor layer, the above-described plural semiconductors may be used in combination.

For example, several kinds of the above-described metal oxide or metal sulfide may be used in combination, and 20% by weight of titanium nitride ($Ti_3N_4$) may be mixed in titanium oxide semiconductor to be used.

The zinc oxide/tin oxide composite described in J. Chem. Soc., Chem. Commun., 15 (1999) may also be applied thereto. In this case, when a component other than metal oxide or metal sulfide is added as a semiconductor, a content of such the addition component is preferably 30% by weight with respect to the metal oxide or metal sulfide semiconductor.

A semiconductor relating to the present invention may be subjected to a surface treatment employing an organic base. Preferable examples of the foregoing organic base include diarylamine, triarylamine, pyridine, 4-t-butylpyridine, polyvinylpyridine, quinoline, piperidine, amidine and so forth. Among them, pyridine, 4-t-butylpyridine and polyvinylpyridine are preferable.

In cases where the above-described organic base is liquid, a solution dissolved in an organic solvent is prepared when it is solid, and a surface treatment can be conducted by immersing a semiconductor of the present invention in liquid organic base or an organic base solution.

<<Preparation of Semiconductor Layer>>

A method of preparing a semiconductor layer will be described. In cases where a semiconductor in the semiconductor layer is particle-shaped, the semiconductor layer may be prepared by coating or spraying particles onto a conductive support. Further, in cases where the semiconductor of the present invention is in the form of a film, and is not supported on the conductive support, the semiconductor layer is preferably prepared by adhering the semiconductor onto the conductive support.

As a preferable embodiment for the semiconductor layer, provided is a method of forming via calcination employing semiconductor particles provided on the above-described conductive support. When a semiconductor of the present invention is prepared via calcination, the semiconductor is preferably subjected to a sensitization (adsorption, filling in a porous layer, and so forth) treatment employing a dye after calcination. After the calcination, specifically, the compound is preferably subjected to an adsorption treatment rapidly before adsorbing water to the semiconductor.

Next, a method of forming a semiconductor layer via calcination employing semiconductor particles, which is preferably utilized in the present invention, will be described in detail.

(Preparation of Semiconductor Powder-Containing Coating Solution)

First, a semiconductor powder-containing coating solution is prepared. The primary particle diameter of this semiconductor powder is preferably as fine as possible. The semiconductor powder preferably has a primary particle diameter of 1-5000 nm, and more preferably has a primary particle diameter of 2-100 nm. The coating solution containing the semiconductor powder can be prepared by dispersing the semiconductor powder in a solvent.

The semiconductor powder dispersed in the solvent is dispersed in the form of the primary particle. The solvent is not specifically limited as long as it can disperse the semiconductor powder.

As the foregoing solvent, water, an organic solvent, and a mixture of water and an organic solvent are included. As the organic solvent, alcohol such as methanol, ethanol or the like, ketone such as methyl ethyl ketone, acetone, acetylacetone, or the like and hydrocarbon such as hexane, cyclohexane or the like are usable. A surfactant and a viscosity controlling agent (polyhydric alcohol such as polyethylene glycol or the like) can be added into a coating solution, if desired. The content of the semiconductor powder in the solvent is preferably 0.1-70% by weight, and more preferably 0.1-30% by weight.

(Coating of Semiconductor Powder-Containing Coating Solution and Calcination Treatment of Formed Semiconductor Layer)

The semiconductor powder-containing coating solution obtained as described above is coated or sprayed onto the conductive support, followed by drying, and then burned in air or inactive gas to form a semiconductor layer (referred to also as a semiconductor film) on the conductive support.

The layer formed via coating the semiconductor powder-containing coating solution onto the conductive support, followed by drying is composed of an aggregate of semiconductor particles, and the particle diameter corresponds to the primary particle diameter of the utilized semiconductor powder.

The semiconductor particle layer formed on a conductive layer of the conductive support or the like in such the way is subjected to a calcination treatment in order to increase mechanical strength and to produce a semiconductor layer firmly attached to a substrate, since the semiconductor particle layer exhibits bonding force with the conductive support, as well as bonding force between particles, and also exhibits weak mechanical strength.

The semiconductor layer may have any structure, but a porous structure layer (referred to also as a porous layer possessing pores) is preferable. When the semiconductor layer is a porous structure layer, it is preferable that components of a hole transport material or the like in a charge transport layer is present in this pore.

The semiconductor layer preferably has a porosity of 10% by volume or less, more preferably has a porosity of 8% by volume or less, and most preferably has a porosity of 0.01-5% by volume. In addition, the porosity of the semiconductor layer means a through-hole porosity in the direction of thickness of a dielectric, and it can be measured by a commercially available device such as a mercury porosimeter (Shimadzu Pore Analyzer 9220 type) or the like.

A semiconductor layer as a calcine film having a porous structure preferably has a thickness of at least 10 nm, and more preferably has a thickness of 500-30000 nm.

A calcination temperature of less than 1,000° C. is preferable, a calcination temperature of 200-800° C. is more preferable, and a calcination temperature of 300-800° C. is still more preferable in view acquisition of a calcine film having the above-described porosity by suitably preparing real surface area of the calcine film during calcination treatment.

In cases where the substrate is made of plastic or the like, and exhibits less heat resistance, not only fixing adhesion of particle-to-particle or particle-to-substrate can be made via pressure application without conducting a calcinations treatment, but also only the semiconductor layer can be subjected to a heat treatment via microwaves with no heat application to a substrate.

Further, a ratio of the real surface area to the apparent surface area can be controlled by a diameter and specific surface area of the semiconductor particle, the calcination temperature and so forth.

After conducting a heat treatment, chemical plating employing an aqueous solution of titanium tetrachloride or electrochemical plating employing an aqueous solution of titanium tetrachloride may be conducted in order to increase the surface area of a semiconductor particle and purity in the vicinity of the semiconductor particle, and to increase an electron injection efficiency from a dye to a semiconductor particle.

(Dye)

A sensitizing dye which is preferably used in the present invention is carried on a semiconductor via a sensitizing treatment which will be described below, and is capable of producing an electromotive force via photoexcitation. As the embodiments of the dye which is carried on the semiconductor, an embodiment in which the dye is adsorbed on the semiconductor surface, and an embodiment in which the dye fills the pores when the semiconductor exhibits a porous structure, may be cited.

The photoelectric conversion element of the present invention is specifically preferably applied when the dye having an imidazolone moiety or a dye containing ruthenium is employed.

The dye having an imidazolone moiety is one having an imidazolone residue, and, for example, a compound represented by following Formula (D) may be cited as a preferable dye. As an example of the dye containing ruthenium, a dye disclosed in paragraph [0026] of JP-A No. 2009-179629 may be cited.

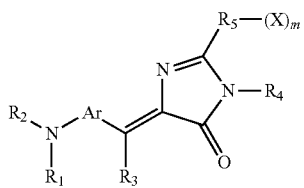

Formula (D)

In Formula (D), Ar represents substituted or non-substituted arylene group or a substituted or non-substituted heterocyclic group. $R_1$ and $R_2$ each represent an alkyl group, an alkenyl group, an alkynyl group, an aryl group, or a heterocycle group, each of which may be substituted or non-substituted. $R_1$, $R_2$ and Ar may be combined to form a ring. $R_3$ and $R_4$ each represent a hydrogen atom, an alkyl group, an alkenyl group, an alkynyl group, an aryl group, an amino group, an cyano group, or a heterocycle group, each of which may be substituted or non-substituted. $R_5$ represents an alkyl group, an alkenyl group, an alkynyl group, an alkoxy group, a thioalkoxy group, a selenoalkoxy group, an amino group, an aryl group, or a heterocycle group, each of which is at least substituted with X and may be further substituted or non-substituted. X represents an acid group. "m" represents an integer of 1 or more. When m≥2, plural X may be the same or different. The carbon-carbon double bond may be of a cis-form or a trans-form.

(Sensitizing Treatment of Semiconductor)

The total carrying amount of a sensitizing dye which may be used in the present invention per $m^2$ of a semiconductor layer is preferably 0.01-100 mmol/$m^2$, more preferably 0.1-50 mmol/$m^2$, and still more preferably 0.5-20 mmol/$m^2$.

When conducting a sensitization treatment, the sensitizing dye may be used singly or in combination with at least two kinds. Further, the sensitizing dye can be mixed in combination with other compounds, and examples thereof include compounds disclosed in U.S. Pat. No. 4,927,721, U.S. Pat. No. 5,084,365, U.S. Pat. No. 5,350,644, U.S. Pat. No. 5,463,057, U.S. Pat. No. 5,525,440, JP-A No. 7-249790, and JP-A No. 2000-150007.

Specifically in the case of the photoelectric conversion element of the present invention used for a solar cell, at least two dyes differing in absorption wavelength ranges are preferably used, so that the wavelength region for photoelectric conversion is expanded as broad as possible to achieve effective utilization of solar light.

In order to carry a sensitizing dye with a semiconductor, generally, the sensitizing dye is dissolved in an appropriate solvent (ethanol or the like) and a well-dried semiconductor is immersed into the solution for a long duration.

When using plural kinds of sensitizing dyes or using the sensitizing dye in combination with other sensitizing dyes to conduct a sensitizing treatment, a mixed solution of each of the dyes may be prepared, or an individual solution for each of the dyes may be produced to prepare it via immersion of each of the solutions in order.

When preparing an individual solution for each of the sensitizing dyes to prepare it via immersion of each of the solutions in order, introduction of sensitizing dyes into a semiconductor may be done in any order.

Further, preparation thereof can be made by mixing semiconductor particles onto which the foregoing sensitizing dye is individually adsorbed. Further, in the case of a semiconductor having high porosity, it is preferred to subject the semiconductor to an adsorption treatment of the sensitizing dye before moisture or water vapor is adsorbed onto the semiconductor surface or into pores in the interior of the semiconductor.

As described above, a sensitizing dye is appropriately dissolved in a solvent, and a substrate with the foregoing calcined semiconductor is immersed in the resulting solution to conduct a sensitizing treatment for the semiconductor.

In this case, air bubbles in the film are preferably removed via a depressurizing treatment or a heat treatment in advance from a substrate formed via calcination of a semiconductor layer (referred to also as a semiconductor film). By conducting such a treatment, a sensitizing dye can be designed to be deeply penetrated into the inside of the semiconductor layer (semiconductor film), and the case where the semiconductor layer (semiconductor film) is a film having a porous structure is specifically preferable.

The solvent used for dissolving a sensitizing dye is not specifically limited, as long as it does not dissolve or react the semiconductor, but can dissolve the sensitizing dye.

However, digassing and distillation purification in advance are preferable in order to avoid suppression of a sensitizing treatment such as adsorption of a sensitizing dye, or the like via penetration of a water content and gas dissolved in the solvent into the semiconductor film.

Examples of preferably usable solvents for dissolving the sensitizing dye include a nitrile based solvent such as acetonitrile or the like; an alcohol based solvent such as methanol, ethanol, n-propanol or the like; a ketone based solvent such as acetone, methylethyl ketone or the like; an ether based solvent such as diethyl ether, diisopropyl ether, tetrahydrofuran, 1,4-dioxane or the like; a halogenated hydrocarbon solvent such as methylene chloride, 1,1,2-trichloroethane or the like; and a mixture of plural solvents thereof. Specifically preferable are acetonitrile, a mixed solvent of acetonitrile and methanol, methanol, ethanol, acetone, methylethyl ketone, tetrahydrofuran and methylene chloride.

(Temperature and Duration of Sensitizing Treatment)

As to a duration of immersing a substrate with a calcined semiconductor in a solution containing a sensitizing dye, the solution is deeply penetrated into a semiconductor layer (semiconductor film) to sufficiently accelerate adsorption thereof or the like, whereby the semiconductor is preferred to be sufficiently sensitized.

In order to avoid suppression of adsorption of a dye, caused by a decomposing material produced via decomposition of the dye in the solution, the duration is preferably 3-48 hours, and more preferably 4-24 hours at 25° C.

This effect is vividly produced specifically in cases where the semiconductor film is a film having a porous structure. However, the immersion duration is a duration at 25° C., but this condition may be different when the temperature condition is varied.

In order to conduct immersion, a solution containing a dye employed in the present invention may be heated up to the temperature of no boiling, as long as the foregoing dye is not decomposed. The temperature range is preferably 5-100° C., and more preferably 25-80° C., as long as the solution is not boiled in the foregoing temperature range.

(Charge Transport Layer)

The charge transport layer has a function to reduce the oxidized dye after absorbing light and then injecting the electron into the semiconductor, and to transport the charge injected from the dye at an interface with the dye to the second electrode.

The charge transport layer contains, as the main component, a redox electrolyte dispersion or a p-type compound semiconductor (charge transporting material) as a hole transport material, and optionally a film-forming material such as a binder.

Examples of a redox electrolyte include an $I^-/I_3^-$ system, a $Br^-/Br_3^-$ system and a quinone/hydroquinone system.

Such a redox electrolyte can be obtained by commonly known methods. For instance, an electrolyte of the $I^-/I_3^-$ system can be obtained, for example, by mixing ammonium iodide with iodine.

A dispersion in which an electrolyte is dispersed in a liquid is called a liquid electrolyte, a dispersion in which an electrolyte is dispersed in a solid polymer at ordinary temperature is called a solid polymer electrolyte, and a dispersion in which an electrolyte is dispersed in a gelled material is called a gel electrolyte.

When a liquid electrolyte is used as a charge transport layer, a solvent which is electrochemically inert is used, including, for example, acetonitrile, propylene carbonate and ethylene carbonate.

As an example of a solid polymer electrolyte, for example, an electrolyte described in JP-A No. 2001-160427 may be cited, and as an example of a gel electrolyte, for example, an electrolyte described in "Hyomen Kagaku" (Surface Science) 21 [5] 288-293 may be cited.

The charge transporting material preferably has a large band gap in so as not to prevent absorption of the dye. The band gap of the charge transporting material used in the invention is preferably not less than 2 eV, and more preferably not less than 2.5 eV.

It is necessary that the ionization potential of the charge transporting material be smaller than that of a dye-adsorbing electrode in order to reduce the dye hole.

The ionization potential of the charge transporting material used varies due to kinds of a dye used, but it is preferably from 4.5 to 5.5 eV, and more preferably from 4.7 to 5.3 eV.

As the charge transport material, an aromatic amine derivative is preferred, which has excellent hole transporting capability.

Accordingly, a charge transport layer containing mainly a charge transporting material can improve a photoelectric conversion efficiency.

As the aromatic amine derivative, a triphenyldiamne derivative is especially preferred. Among the aromatic amine derivatives, the triphenyldiamne derivative has an especially superior hole transporting capability. The aromatic amine derivatives may be a monomer, an oligomer, a prepolymer, a polymer, or a mixture thereof.

The monomer, oligomer, and prepolymer have a relatively low molecular weight and have a high solubility to an organic solvent.

Accordingly, when a charge transport layer is formed by a coating method, these are advantageous in that adjustment of a charge transporting composition is easy.

As the oligomer, a dimer or a trimer is preferably used.

Typical examples of the aromatic tertiary amine compound and styrylamine compound include N,N,N',N'-tetraphenyl-4,4'-diaminophenyl, N,N'-diphenyl-N,N'-bis(3-methylphenyl)-[1,1'-biphenyl]-4,4'-diamine (TPD), 2,2'-bis(4-di-p-tolylaminophenyl)propane, 1,1-bis(4-di-p-tolylaminophenyl)cyclohexane, N,N,N',N'-tetra-p-tolyl-4,4'-diaminobiphenyl, 1,1-bis(4-di-p-tolylaminophenyl)-4-phenylcyclohexane, bis(4-dimethylamino-2-methylphenyl)-phenylmethane, bis(4-di-p-tolylaminophenyl)phenylmethane, N,N'-diphenyl-N,N'-di(4-methoxyphenyl)-4,4'-diaminobiphenyl, N,N,N',N'-tetraphenyl-4,4'-diaminodiphenyl ether, 4,4'-bis(diphenylamino)quardriphenyl, N,N,N-tri(p-tolyl)amine, 4-(di-p-tolylamino)-4'-[4-(di-p-tolylamino)styryl]stilbene, 4-N,N-diphenylamino(2-diphenylvinyl)benzene, 3-methoxy-4'-N,N-diphenylaminostylbenzene, N-phenylcarbazole, compounds described in U.S. Pat. No. 5,061,569 which have two condensed aromatic rings in the molecule thereof such as 4,4'-bis[N-(1-naphthyl)-N-phenylamino]biphenyl (NPD), and compounds described in Japanese Patent O.P.I. Publication No. 4-308688 such as 4,4',4"-tris[N-(3-methylphenyl)-N-phenylamino]-triphenylamine (MTDATA) in which three triphenylamine units are bonded in a starburst form.

A p-type semiconductor polymer in which the material mentioned above is introduced in the polymer chain or a polymer having the material as the polymer main chain can be also used.

Examples of a charge transport material other than the aromatic amine derivatives include a thiophene derivative, a pyrrole derivative and a stilbene derivative.

The charge transport layer is formed by coating/drying of the charge transport material or p-type semiconductor compound as described previously, or by coating or supplying a dispersion containing the aforementioned redox electrolyte to the photoelectric conversion layer to fill the space for charge transport layer.

(Substrate)

A substrate is provided on the light-incident side. The substrate preferably has a light transmittance of 10% or more; more preferably has a light transmittance of 50% or more; and most preferably has a light transmittance of 80-100%.

The light transmittance means total light transmittance in the visible light wavelength region, which is measured by a method in accordance with JIS K 7361-1 (corresponding to ISO 13468-1) "Plastics—Determination of the total luminous transmittance of transparent materials".

Substrates with those commonly known such as material, shape, structure, thickness, hardness and so forth can be appropriately selected, but preferably exhibit high optical transparency as described above.

Examples of the substrate include a polyester based resin film such as polyethylene terephthalate (PET), polyethylene naphthalate, modified polyester or the like; a polyolefin based resin film such as a polyethylene (PE) resin film, a polypropyrene (PP) resin film, a polystyrene resin film, a cyclic olefin based resin or the like; a vinyl based resin film such as polyvinyl chloride, polyvinylidene chloride or the like; a polyvinyl acetal resin film such as polyvinyl butyral (PVB) or the like; a polyetherether ketone (PEEK) resin film; a polysulphone (PSF) resin film; a polyethersulphone (PES) resin film; a polycarbonate resin film; a polyamide resin film; a polyamide resin film; an acrylic resin film; a triacetyl cellulose (TAC) resin film and so forth. Inorganic glass films other than these resin films may be used as the substrate.

If the resin film has a light transmittance of 80% or more in the visible light wavelength region (380-780 nm), it is preferably applicable for the present invention.

Among the above-described, a biaxially-stretched polyethylene terephthalate film, a biaxially-stretched polyethylene naphthalate film, a polyethersulphone film and a polycarbonate film are preferable, and a biaxially-stretched polyethylene terephthalate film and a biaxially-stretched polyethylene naphthalate film are more preferable in view of transparency, heat resistance, easy handling, strength and cost.

These substrates can be subjected to a surface treatment, and an adhesion increasing layer can be provided for each of these substrates in order to acquire wettability of a coating solution and adhesion thereof.

As to a surface treatment or an adhesion increasing layer, a commonly known technique can be used conventionally. For example, as the surface treatment, provided can be a surface activation treatment such as a corona discharge treatment, a flame treatment, a UV treatment, a high-frequency treatment, a glow discharge process, an activated plasma treatment and a laser treatment.

Further, as the adhesion increasing layer, provided can be polyester, polyamide, polyurethane, a vinyl based copolymer, a butadiene based copolymer, an acrylic copolymer, a vinylidene based copolymer and an epoxy based copolymer.

The substrate preferably has a thickness of 1-1000 µm, and more preferably has a thickness of 10-100 µm.

(First Electrode)

The first electrode is placed between a substrate and a photoelectric conversion layer.

The first electrode having a light transmittance of 80% or more, and further having a light transmittance of 90% or more is preferably used. The light transmittance is the same one as described in the explanation of the above-described substrate.

The first electrode is placed on one surface being on the opposite side with respect to the light-incident direction of the substrate.

Examples of material constituting the first electrode include metal such as platinum, gold, silver, copper, aluminum, rhodium or indium, and metal oxide such as $SnO_2$, CdO, ZnO, a CTO system ($CdSnO_3$, $Cd_2SnO_4$ or $CdSnO_4$), $In_2O_3$, $CdIn_2O_4$ or the like.

Silver is provided as preferred metal, and in order to obtain optical transparency, an opening-possessing film subjected to grid-patterning, or a film coated by dispersing particles or nanowires are preferably employed.

A composite (doped) material in which at least one selected from the group consisting of Sn, Sb, F and Al is added into the above-described metal oxide is provided as preferred metal oxide.

Among the above-described, conductive metal oxide such as Sn-doped $In_2O_3$ (ITO), Sb-doped $SnO_2$, F-doped $SnO_2$ (FTO) or the like is preferably used, and FTO is most preferable in view of heat resistance.

Herein, one, in which the first electrode is provided on a substrate, is referred to as a conductive support.

The conductive support has a film thickness of 0.1-5 mm.

Further, the conductive support preferably has a surface resistance of $50\Omega/\square$ or less, and more preferably has a surface resistance of $10\Omega/\square$ or less.

The preferred light transmittance range of a conductive support is identical to the preferred light transmittance range of the above-described substrate.

(Barrier Layer)

The photoelectric conversion element of the present invention serving as a short-circuit protection device is in the form of a film (in the form of a layer), and preferably has a barrier layer situated between the first electrode and a semiconductor layer.

A barrier layer and a photoelectric conversion layer are preferably porous, but in cases when the barrier layer has a porosity of C %, and the semiconductor layer has a porosity of D %, D/C is preferably about 1.1 or more; more preferably about 5 or more; and most preferably about 10 or more.

Each of the barrier layer and the semiconductor layer suitably exerts its function from those described above.

Specifically, the barrier layer preferably has a porosity C of about 20% or less; more preferably has a porosity C of about 5% or less; and most preferably has a porosity C of about 2% or less. That is, the barrier layer is preferably a dense layer. The foregoing effect can be improved from those described above.

The barrier layer preferably has an average thickness of approximately 0.01-10 µm, and more preferably has an average thickness of approximately 0.03-0.5 µm. The foregoing effect can be improved by those described above.

The constituting material of this barrier layer is not specifically limited, but in combination, usable is at least one selected from the group consisting of zinc, niobium, tin, titanium, vanadium, indium, tungsten, tantalum, zirconium, molybdenum, manganese, iron, copper, nickel, iridium, rhodium, chromium, ruthenium and oxides thereof; perovskite such as strontium titanate, calcium titanate, barium titanate, magnesium titanate or strontium niobate, and a composite oxide or an oxide mixture thereof; various metal compounds such as CdS, CdSe, TiC, $Si_3N_4$, SiC and BN; and so forth.

Specifically in cases where the charge transport layer is formed from a p-type semiconductor, a barrier layer when using metal for the barrier layer has a smaller work function than that of the charge transport layer, and one brought into Schottky type contact is utilized. Further, in cases where metal oxide is used for the barrier layer, the barrier layer is brought into ohmic contact with a transparent conductive layer, and one in which an energy level of the conductive band is lower than that of porous semiconductor layer 4 is preferable.

In this case, the efficiency of electron transfer from the porous semiconductor layer (photoelectric conversion layer) to the barrier layer can be improved via selection of oxide.

Of these, those having electrical conductivity comparable to that of a semiconductor are preferable, and titanium oxide as a main material is more preferable.

(Second Electrode)

The second electrode may be one exhibiting conductivity, and any conductive material is optionally usable.

A material exhibiting insulation is also usable for the second electrode, as long as a conductive material layer is provided on the side facing the charge transport layer.

It is preferable that the second electrode is brought into good contact with the charge transport layer. Also, it is preferable that the second electrode shows a small difference in the work function with that of the charge transport layer, and exhibits an excellent chemical stability. As such a material, usable are a thin film made of a metal such as gold, silver, aluminum, platinum or the like, and an organic conductive material such as carbon black, a conductive polymer or the like.

(Solar Cell)

A dye sensitized solar cell of the present invention possesses a photoelectric element of the present invention as described above.

The dye-sensitized solar cell of the present invention employs the aforementioned photoelectric conversion element, and is designed so that the circuit design is optimized for the sunlight to conduct optimize photoelectric conversion when sunlight is utilized as a light source.

That is, a structure capable of being able to expose a dye-sensitized semiconductor to sunlight has been realized. When a solar cell of the present invention is designed to be provided, it is preferred that the foregoing photoelectric conversion layer and the second electrode are stored in a case and sealed, or they are entirely resin-sealed.

When the solar cell of the present invention is irradiated with sunlight or electromagnetic waves equivalent to sunlight, the foregoing sensitizing dye carried by a semiconductor is excited by absorbing irradiated light or electromagnetic waves.

Electrons generated via excitation are moved to the semiconductor; subsequently moved to the second electrode via a conductive support and an external load; and supplied into a hole transport material constituting a charge transport layer.

On the other hand, the sensitizing dye from which electrons are moved to the semiconductor becomes an oxidant, but electrons are supplied from the second electrode via the hole transport material contained in the charge transport layer to conduct reducing whereby they are returned to the original state via reduction thereof. At the same time, the hole transport material in the charge transport layer is oxidized to return to a state capable of being reduced again by electrons supplied from the second electrode. Thus, the electrons flow in this manner, whereby the solar cell of the present invention can be constructed.

EXAMPLES

The present invention will be described referring to Examples, but the present invention is not limited thereto.

(Preparation of Photoelectric Conversion Element 1)

A titanium oxide paste (anatase type having a primary average particle diameter of 18 nm, observed with a microscope, and dispersed in polyethylene glycol) was coated onto a fluorine-doped tin oxide conductive glass substrate (hereinafter, referred to also as FTO, the first electrode) by a screen printing method (printing area of 5×5 mm$^2$). The coating and drying (at 120° C. for 3 minutes) each were made three times. Then, the paste was heated at 200° C. for 10 minutes and subsequently calcinated at 500° C. for 15 minutes to obtain a titanium oxide thin film having a thickness of 5 μm.

Dye 1 of the present invention was dissolved in a mixed solvent of acetonitrile and t-butyl alcohol (1:1) to prepare a 5×10$^{-4}$ mol/l of dye solution. The FTO glass substrate on which titanium oxide paste was coated and heated was immersed in this solution at room temperature for 3 hours to prepare an oxide semiconductor electrode.

The above semiconductor electrode was immersed in an acetonitrile solution which contained 1×10$^{-3}$ (mole/l) of Bis-EDOT which was a dimer of 3,4-ethylenedioxythiophene (EDOT) and 0.1 (mole/l) of Li [(CF$_3$SO$_2$)$_2$N]. A charge transport layer which was a conductive polymer containing an EDOT monomer unit was formed on the aforementioned semiconductor electrode surface according to the method described below. A voltage of −0.16 V was applied for 30 minutes to the above semiconductor electrode as the working electrode using a platinum plate as a counter electrode and an Ag/Ag$^+$ reference electrode (AgNO$_3$, 0.01 M), while the working electrode was irradiated with light from the semiconductor layer side (using a xenon lamp having a light intensity of 22 mW/cm$^2$, while the light of wavelength of 430 nm or less was cut).

The obtained semiconductor electrode/charge transport layer was washed with acetonitrile and then dried. The charge transport layer which was a conductive polymer containing an EDOT monomer unit was obtained as above was a polymer film insoluble to the solvent. Then, the semiconductor electrode/charge transport layer was immersed in an acetonitrile solution containing 15 mM (mmol/l) of Li [(CF$_3$SO$_2$)$_2$N] and 50 mM of Compound 1 for 30 minutes. Then, after the semiconductor electrode/charge transport layer was naturally dried, 90 nm of gold film was vacuum evaporated, whereby Photoelectric conversion element 1 of the present invention was obtained.

(Preparation of Photoelectric Conversion Element2 2-42)

Photoelectric conversion elements 2-42 were prepared in the same manner as the preparation of Photoelectric conversion element 1 except that the dyes, the compounds represented by Formula (1) or the comparative compounds as shown in Table 1 were used.

[Evaluation of Electric Generation Property]

The above Photoelectric conversion elements 1-42 were used as Solar cells 1-42, and the following evaluation was carried out.

Each evaluation test was carried out by exposing a photoelectric conversion element to pseudo-sunlight at 100 mW/cm$^2$ from a xenon lamp through AM filter (AM-1.5), employing a solar simulator (manufactured by EIKO Instruments Co., Ltd.). For each photoelectric conversion element, short-circuit current (Jsc), open voltage (Voc) and fill factor (F.F.) were determined by measuring a current-voltage characteristic using an I-V tester at room temperature.

A conversion efficiency η has the same meaning as a photoelectric conversion efficiency η, and represents an efficiency when photo energy (W) is converted into electric energy (W). A conversion efficiency of the photoelectric conversion element (η (%)) was calculated based on the following Equation (A).

$$\eta = 100 \times (Voc \times Jsc \times F.F.)/P \qquad \text{Equation (A)}$$

where P represents incident light intensity [mW/cm$^{-2}$]; Voc represents open circuit voltage [V]; Jsc represents short-circuit current density [mA/cm$^{-2}$]; F.F. represents a fill factor.

The results of the evaluation will be given in Table 1.

TABLE 1

| Photoelectric conversion element No. | Dye | Compound represented by Formula (1) or comparative compound | Voc (mV) | Jsc (mA/cm$^2$) | η (%) | Remarks |
|---|---|---|---|---|---|---|
| 1 | Dye 1 | Compound 1 | 760 | 5.59 | 2.55 | Inv. |
| 2 | Dye 1 | Compound 3 | 800 | 6.88 | 2.92 | Inv. |
| 3 | Dye 1 | Compound 4 | 720 | 7.15 | 2.93 | Inv. |
| 4 | Dye 1 | Compound 5 | 750 | 6.10 | 2.61 | Inv. |
| 5 | Dye 1 | Compound 8 | 850 | 7.21 | 3.86 | Inv. |
| 6 | Dye 1 | Compound 9 | 830 | 7.09 | 3.53 | Inv. |
| 7 | Dye 1 | Compound 10 | 830 | 6.63 | 3.41 | Inv. |
| 8 | Dye 1 | Compound 35 | 820 | 6.89 | 3.33 | Inv. |
| 9 | Dye 1 | Compound 36 | 730 | 6.95 | 2.88 | Inv. |
| 10 | Dye 1 | Compound 41 | 830 | 6.79 | 3.66 | Inv. |
| 11 | Dye 1 | Compound 67 | 790 | 6.72 | 3.24 | Inv. |
| 12 | Dye 1 | Compound 76 | 770 | 6.34 | 3.03 | Inv. |
| 13 | Dye 2 | Compound 1 | 730 | 4.02 | 1.58 | Inv. |
| 14 | Dye 2 | Compound 3 | 790 | 4.23 | 1.90 | Inv. |
| 15 | Dye 2 | Compound 4 | 740 | 4.26 | 1.99 | Inv. |
| 16 | Dye 2 | Compound 5 | 730 | 4.10 | 1.63 | Inv. |
| 17 | Dye 2 | Compound 8 | 820 | 4.86 | 2.55 | Inv. |
| 18 | Dye 2 | Compound 9 | 800 | 4.65 | 2.31 | Inv. |
| 19 | Dye 2 | Compound 10 | 780 | 3.99 | 1.93 | Inv. |
| 20 | Dye 2 | Compound 35 | 760 | 4.36 | 2.02 | Inv. |
| 21 | Dye 2 | Compound 36 | 730 | 4.11 | 1.77 | Inv. |
| 22 | Dye 2 | Compound 41 | 800 | 4.28 | 2.05 | Inv. |
| 23 | Dye 2 | Compound 67 | 770 | 4.42 | 1.91 | Inv. |
| 24 | Dye 2 | Compound 76 | 760 | 4.53 | 2.13 | Inv. |
| 25 | Dye 3 | Compound 1 | 740 | 4.26 | 1.99 | Inv. |
| 26 | Dye 3 | Compound 3 | 800 | 5.28 | 2.62 | Inv. |
| 27 | Dye 3 | Compound 4 | 740 | 5.33 | 2.21 | Inv. |
| 28 | Dye 3 | Compound 5 | 760 | 4.36 | 1.89 | Inv. |
| 29 | Dye 3 | Compound 8 | 800 | 5.84 | 3.04 | Inv. |
| 30 | Dye 3 | Compound 9 | 830 | 5.54 | 2.90 | Inv. |
| 31 | Dye 3 | Compound 10 | 790 | 5.10 | 2.42 | Inv. |
| 32 | Dye 3 | Compound 35 | 760 | 5.73 | 2.57 | Inv. |
| 33 | Dye 3 | Compound 36 | 750 | 5.44 | 2.49 | Inv. |
| 34 | Dye 3 | Compound 41 | 790 | 5.36 | 2.37 | Inv. |
| 35 | Dye 3 | Compound 67 | 790 | 5.55 | 2.67 | Inv. |
| 36 | Dye 3 | Compound 76 | 770 | 5.12 | 2.44 | Inv. |
| 37 | Dye 1 | Aminopyridine | 700 | 2.13 | 0.75 | Comp. |
| 38 | Dye 2 | Aminopyridine | 720 | 1.66 | 0.61 | Comp. |
| 39 | Dye 3 | Aminopyridine | 690 | 1.96 | 0.70 | Comp. |
| 40 | Dye 1 | tBP | 750 | 2.58 | 1.06 | Comp. |
| 41 | Dye 2 | tBP | 720 | 2.01 | 0.78 | Comp. |
| 42 | Dye 3 | tBP | 730 | 2.26 | 0.86 | Comp. | tBP: 4-tert-butylpyridine,

Inv.: Inventive example,

Comp.: Comparative example

Dye 1

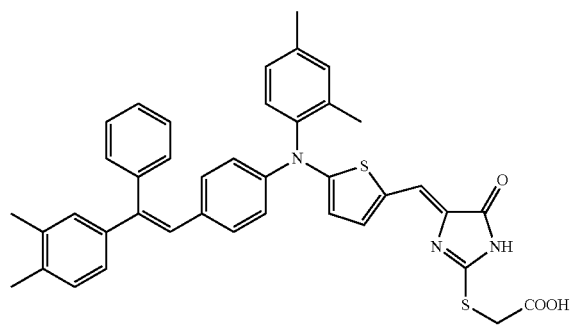

TABLE 1-continued

| Photoelectric conversion element No. | Dye | Compound represented by Formula (1) or comparative compound | Voc (mV) | Jsc (mA/cm$^2$) | η (%) | Remarks |
|---|---|---|---|---|---|---|

Dye 2

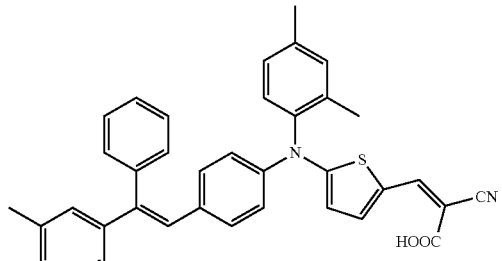

Dye 3

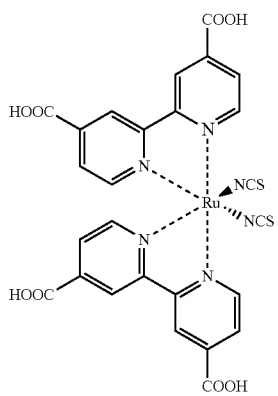

From Table 1, it was found that the photoelectric conversion element having the compound of the present invention in the photoelectric conversion layer exhibits an excellent photoelectric conversion efficiency. Specifically, it was found that the present invention is effective to a photoelectric conversion element employing Dye 1 or Dye 3. It can be deduced that, since Dye 1 has an imidazilone group, the dye adsorbs strongly to the semiconductor layer with the carboxyl group at the terminal of the imidazolone group and coordinates with the carbonyl portion in the imidazolone group. Dye 3 has a plurality of carboxyl group. On the other hand, Dye 2 has just one cyano group. Accordingly, it is assumed that Dye 1 and Dye 3 each have a stronger adsorption force than that that of Dye 2.

A solar cell exhibiting a high photoelectric conversion efficiency could be provided by employing the photoelectric conversion element of the present invention. Also, some of the photoelectric conversion elements of the present invention exhibited a specifically high Jsc. These high Jsc values would shows that the charge smoothly flows through the cell without staying in the inside of the cell, whereby the deterioration the dye is suppressed, and the photoelectric conversion element exhibits high durability.

What is claimed is:
1. A photoelectric conversion element comprising:
    a substrate;
    a first electrode;
    a photoelectric conversion layer comprising
        a semiconductor layer containing a dye and a semiconductor and
        a charge transport layer; and
    a second electrode,
in this order, wherein
    the photoelectric conversion layer comprises a compound represented by Formula (1):

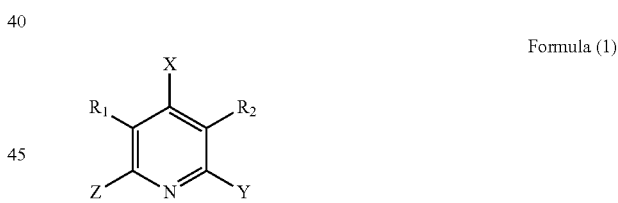

Formula (1)

wherein $R_1$ and $R_2$ each represent a hydrogen atom or an alkyl group which may have a substituent, X, Y and Z each represent a hydrogen atom or a substituent, wherein at least one of X, Y and Z is an electron withdrawing group, and
    wherein the dye has an imidazolone moiety.
2. The photoelectric conversion element of claim 1,
    wherein the electron withdrawing group is an iodo group, a cyano group, —COR$_3$, —COOR$_4$, or —CONR$_5$R$_6$, wherein R$_3$, R$_4$, R$_5$ and R$_6$, each represent an alkyl group which may have a substituent.
3. The photoelectric conversion element of claim 2,
    wherein the electron withdrawing group is —COOR$_4$.
4. The photoelectric conversion element of claim 1,
    wherein X is the electron withdrawing group.
5. The photoelectric conversion element of claim 1,
    wherein the semiconductor layer further comprises a dye which comprises ruthenium.
6. The photoelectric conversion element of claim 1,
    wherein the semiconductor is subjected to a surface treatment using an organic base.

7. The photoelectric conversion element of claim 1, wherein the semiconductor comprises a titanium oxide.

8. The photoelectric conversion element of claim 1, wherein the charge transport layer is formed via polymerization.

9. The photoelectric conversion element of claim 1, wherein the charge transport layer comprises a thiophene derivative.

10. A solar cell comprising the photoelectric conversion element of claim 1.

* * * * *